(12) United States Patent
Chen

(10) Patent No.: US 11,852,280 B2
(45) Date of Patent: Dec. 26, 2023

(54) FIXING DEVICE FOR A PORTABLE ELECTRONIC DEVICE

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

(*) Notice: Subject to any disclaimer, the term of this patent is extended or adjusted under 35 U.S.C. 154(b) by 37 days.

(21) Appl. No.: 17/693,419

(22) Filed: Mar. 14, 2022

(65) Prior Publication Data
US 2023/0291823 A1 Sep. 14, 2023

(51) Int. Cl.
*F16M 11/10* (2006.01)
*H04M 1/06* (2006.01)
*F16M 11/20* (2006.01)

(52) U.S. Cl.
CPC ......... *F16M 11/10* (2013.01); *F16M 11/2014* (2013.01); *H04M 1/06* (2013.01)

(58) Field of Classification Search
CPC ..... F16M 11/10; F16M 11/2014; H04M 1/06; A47B 23/04; A47B 23/043
See application file for complete search history.

(56) References Cited

U.S. PATENT DOCUMENTS

| | | | | |
|---|---|---|---|---|
| 4,323,214 A * | 4/1982 | DeLuca | ............... | A47B 23/043 248/452 |
| 6,971,622 B2 * | 12/2005 | Ziegler | .................. | H04M 1/12 248/455 |
| 7,470,843 B2 * | 12/2008 | Hsieh | ....................... | G10G 5/00 84/327 |
| 7,503,539 B2 * | 3/2009 | Knight | ................. | A47B 23/043 248/458 |
| 7,762,519 B2 * | 7/2010 | Kunii | ..................... | F16M 11/10 248/688 |
| 7,770,864 B2 * | 8/2010 | Phifer | .................. | A47B 23/043 248/455 |
| 8,146,870 B1 * | 4/2012 | Cooper | .................... | G10G 5/00 248/165 |
| 8,186,639 B2 * | 5/2012 | Wang | .................. | F16M 11/247 248/163.1 |
| 8,382,059 B2 * | 2/2013 | Le Gette | ............. | F16M 11/105 248/463 |
| 8,800,763 B2 * | 8/2014 | Hale | ..................... | G06F 1/1628 206/320 |
| 8,876,070 B2 * | 11/2014 | Liu | ........................ | F16M 11/24 248/398 |

(Continued)

*Primary Examiner* — Eret C McNichols
(74) *Attorney, Agent, or Firm* — BruceStone LLP; Joseph A. Bruce

(57) ABSTRACT

A fixing device for a portable electronic device includes: a base including a main body, the main body including a first end and a second end opposite to each other, the main body further including a first side surface and a second side surface opposite to each other; a flip frame having one end pivotally connected to the first end, and the flip frame further including a holding portion for holding an electronic device, the flip frame is pivoted to the main body through a pivoting unit; two swivel members each including a pivoting end; and the base further includes two rotating seats, and one end of each of the two rotating seats is locked to the pivoting unit, and the pivoting ends of the two swivel members is pivotally disposed to the two rotating seats.

15 Claims, 9 Drawing Sheets

(56) References Cited

U.S. PATENT DOCUMENTS

| | | | | |
|---|---|---|---|---|
| 8,899,543 | B2* | 12/2014 | Liang | F16M 13/00 |
| | | | | 248/458 |
| 9,332,837 | B2* | 5/2016 | Pencak | A47B 23/043 |
| 10,098,452 | B2* | 10/2018 | Ko | F16M 11/041 |
| 10,114,416 | B1* | 10/2018 | D'Penha | G06F 1/1632 |
| 11,068,030 | B2* | 7/2021 | Marcks, Jr. | E05D 11/084 |
| 11,457,734 | B2* | 10/2022 | Cheon | A47B 23/06 |
| 11,629,816 | B2* | 4/2023 | Olson | A47B 23/002 |
| | | | | 248/121 |
| 2008/0006753 | A1* | 1/2008 | Campagnoli | A47B 23/043 |
| | | | | 248/398 |
| 2009/0001232 | A1* | 1/2009 | Seo | G06F 1/1635 |
| | | | | 248/176.1 |
| 2009/0140119 | A1* | 6/2009 | To | B42F 13/402 |
| | | | | 248/128 |
| 2009/0152432 | A1* | 6/2009 | Kunii | F16M 11/10 |
| | | | | 248/398 |
| 2012/0170194 | A1* | 7/2012 | Lord | F16M 13/00 |
| | | | | 248/371 |
| 2014/0263939 | A1* | 9/2014 | Rinner | F16M 11/105 |
| | | | | 248/688 |
| 2015/0103057 | A1* | 4/2015 | Lei | F16M 13/00 |
| | | | | 345/179 |
| 2021/0353051 | A1* | 11/2021 | Phifer | F16M 13/00 |
| 2023/0076389 | A1* | 3/2023 | Olson | F16M 11/38 |

* cited by examiner

FIXING DEVICE FOR A PORTABLE ELECTRONIC DEVICE

BACKGROUND

Field of the Invention

The present invention relates to a fixing device, and more particularly to a fixing device for a portable electronic device.

Description of Related Art

Due to the advancement of technology, almost everyone has at least one smart mobile device, such as a mobile phone, tablet computer, etc., and the above mobile devices are equipped with touch panels in order to allow users to operate in an intuitive way. When operating the mobile device, it is necessary to slidably touch the touch panel with multiple fingers. However, most mobile devices are in the form of a flat sheet body and have no additional support device. Therefore, the user needs to spare one hand to hold the mobile device, which is inconvenient to use and easily fatigued. The industry has developed a variety of mobile phone supports. However, most of the above supports can only be placed on flat surfaces, such as tables and chairs. There is a need for a fixing device for portable electronic devices suitable for various situations.

SUMMARY

The present invention relates to a fixing device for a portable electronic device, the main objective of the present invention is to provide a fixing device applicable to various situations.

To achieve the above objective, the fixing device for a portable electronic device provided by the invention comprises:

a fixing device for a portable electronic device, comprising:
a base including a main body, the main body including a first end and a second end opposite to each other, the main body further including a first side surface and a second side surface opposite to each other;
a flip frame having one end pivotally connected to the first end, and the flip frame further including a holding portion for holding an electronic device, the flip frame is pivoted to the main body through a pivoting unit;
two swivel members each including a pivoting end; and
the base further including two rotating seats, and one end of each of the two rotating seats being locked to the pivoting unit, and the pivoting ends of the two swivel members being pivotally disposed to the two rotating seats.

In summary, with the pivoting end of each of the swivel members pivotally connected to the side surface of the main body, the swivel member can rotate relative to the main body to approach or move away from the main body. Therefore, the swivel member can provide a supporting force when in use, and the rotation angle of the swivel member can be adjusted according to different situations, so as to erect the base stably.

In addition to this, the swivel members of the invention are also pivotally disposed to the rotating seats, and the rotating seats are locked to the corresponding members, so the swivel members can rotate synchronously with the rotating seats and the corresponding members, so that the swivel member can pivot along the rotation trajectory of the rotating seat to increase the adjustable range of the swivel member and improve the practicability of the swivel member.

DETAILED DESCRIPTION

Figure 1:
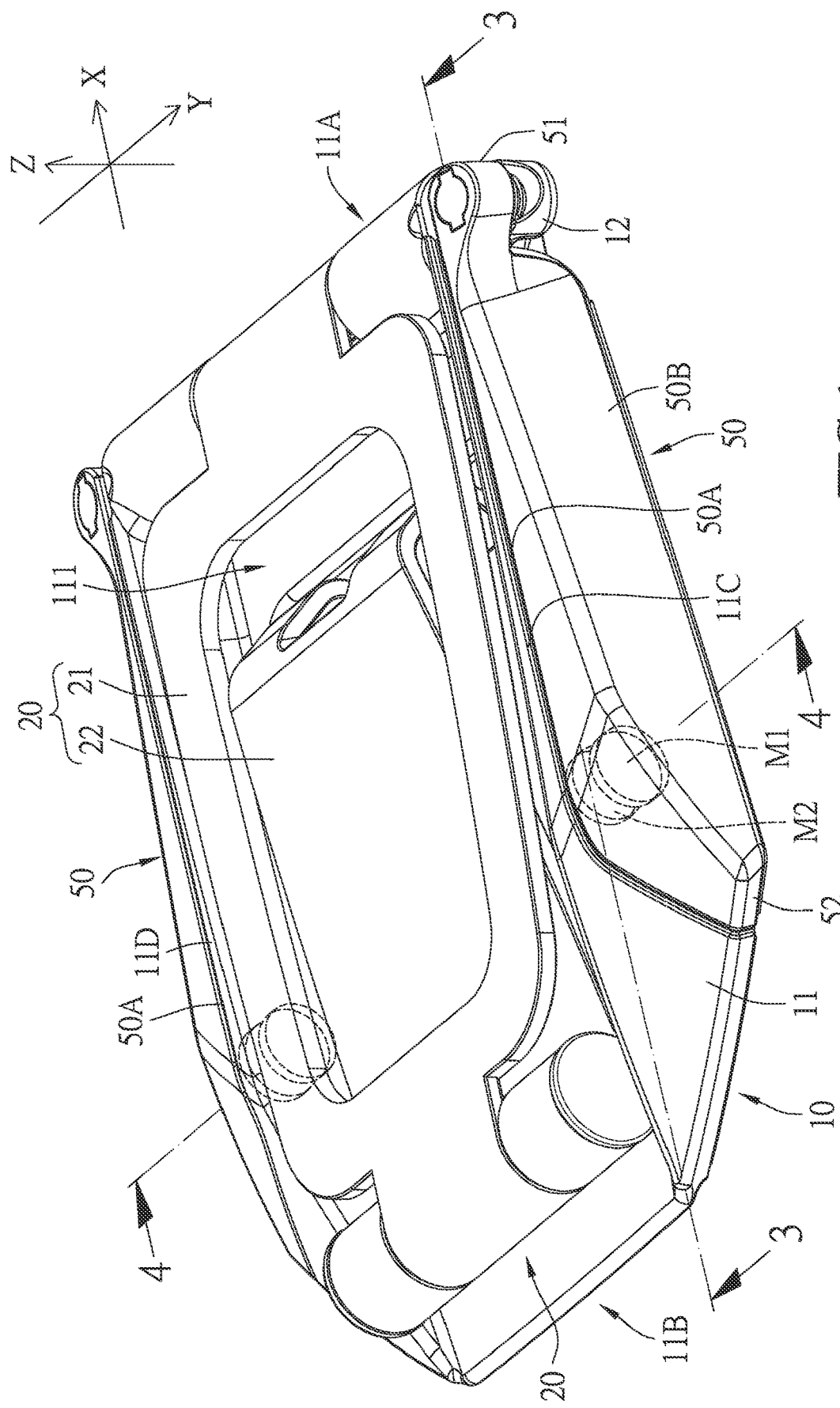
FIG. 1 is an illustrative view showing the fixing device for a portable electronic device of the invention in the storage state.
Figure 2:
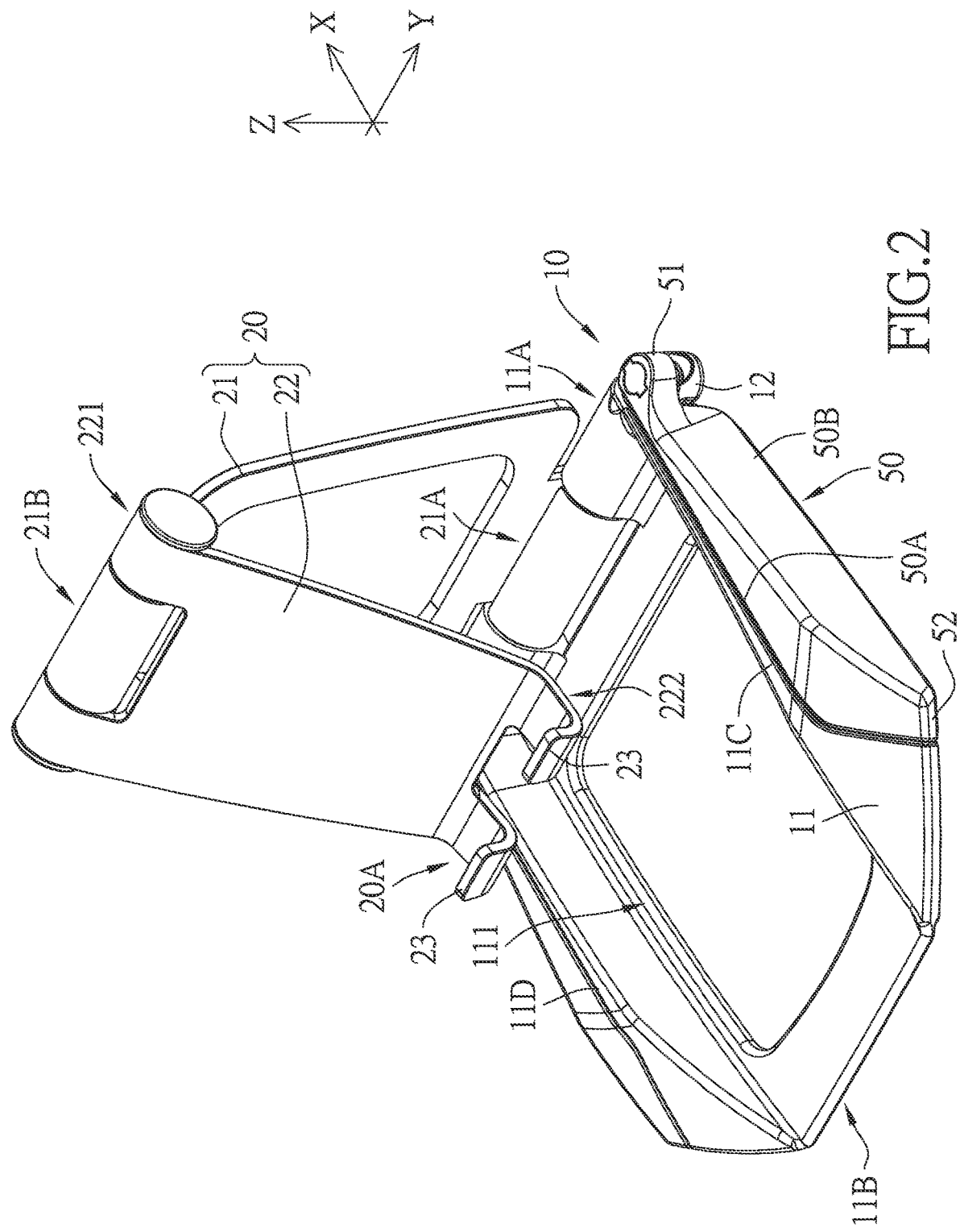
FIG. 2 is an illustrative view showing the fixing device for a portable electronic device of the invention in the unfolded state.
Figure 3:
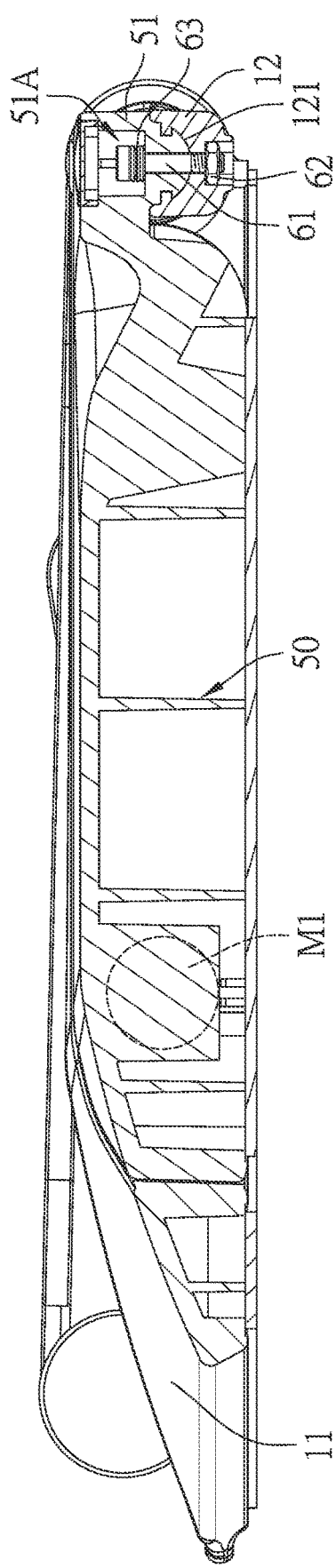
FIG. 3 is a cross-sectional view of the fixing device for a portable electronic device of the invention.

The present invention provides a fixing device for a portable electronic device, please refer to FIGS. 1 to 10, including:

A base 10 includes a main body 11. The main body 11 includes a groove portion 111 and further includes a first end 11A and a second end 11B opposite to each other. An extending direction between the first end 11A and the second end 11B is a longitudinal direction X, and the groove portion 111 extends along the longitudinal direction X. The main body 11 further includes a first side surface 11C and a second side surface 11D opposite to each other, an extending direction between the first side surface 11C and the second side surface 11D is a transverse direction Y, and the transverse direction Y is perpendicular to the longitudinal direction X.

A flip frame 20 has one end pivotally connected to the first end 11A of the main body 11, and the flip frame 20 further includes a holding portion 20A for holding an electronic device E. The flip frame 20 is located in the groove portion 111 in the storage state, and the flip frame 20 is away from the groove portion 111 when in the unfolded state. In this embodiment, the flip frame 20 includes a first bracket 21 and a second bracket 22. The first bracket 21 includes a first pivoting end 21A and a second pivoting end 21B opposite to each other, and the second bracket 22 includes a joint end 221 and a bearing end 222 opposite to each other. The first pivoting end 21A of the first bracket 21 is pivoted to the first end 11A of the main body 11 through a pivoting unit 30, and the second pivoting end 21B of the first bracket 21 is pivotally connected to joint end 221 of the second bracket 22 through a rotating member 40. The holding portion 20A is located at the bearing end 222 of the second bracket 22, so that the first bracket 21 is able to pivot relative to the main body 11 with the pivoting unit 30 as the pivoting center, and the second bracket 22 is able to pivot relative to the first bracket 21 with the rotating member 40 as the pivoting center. The pivoting unit 30 and the rotating member 40 extend along the transverse direction Y, the holding portion 20A is two stop hooks 23 located at the bearing end 222, the two stop hooks 23 are separated by a distance, and the two stop hooks 23 are used to carry the electronic device E.

Two swivel members 50, each of which is generally elongated and includes a pivoting end 51 and a supporting end 52 opposite to each other. The pivoting end 51 is pivoted to the first side surface 11C or the second side surface 11D of the main body 11, and the swivel member 50 can pivot along the plane formed by the transverse direction Y and the longitudinal direction X. One of the swivel members 50 is pivoted to the first side surface 11C, the other swivel member 50 is pivoted to the second side surface 11D, the two swivel members 50 are pivoted to the first end 11A, and the supporting end 52 is used for supporting on a plane or a non-planar surface.

Figure 7:
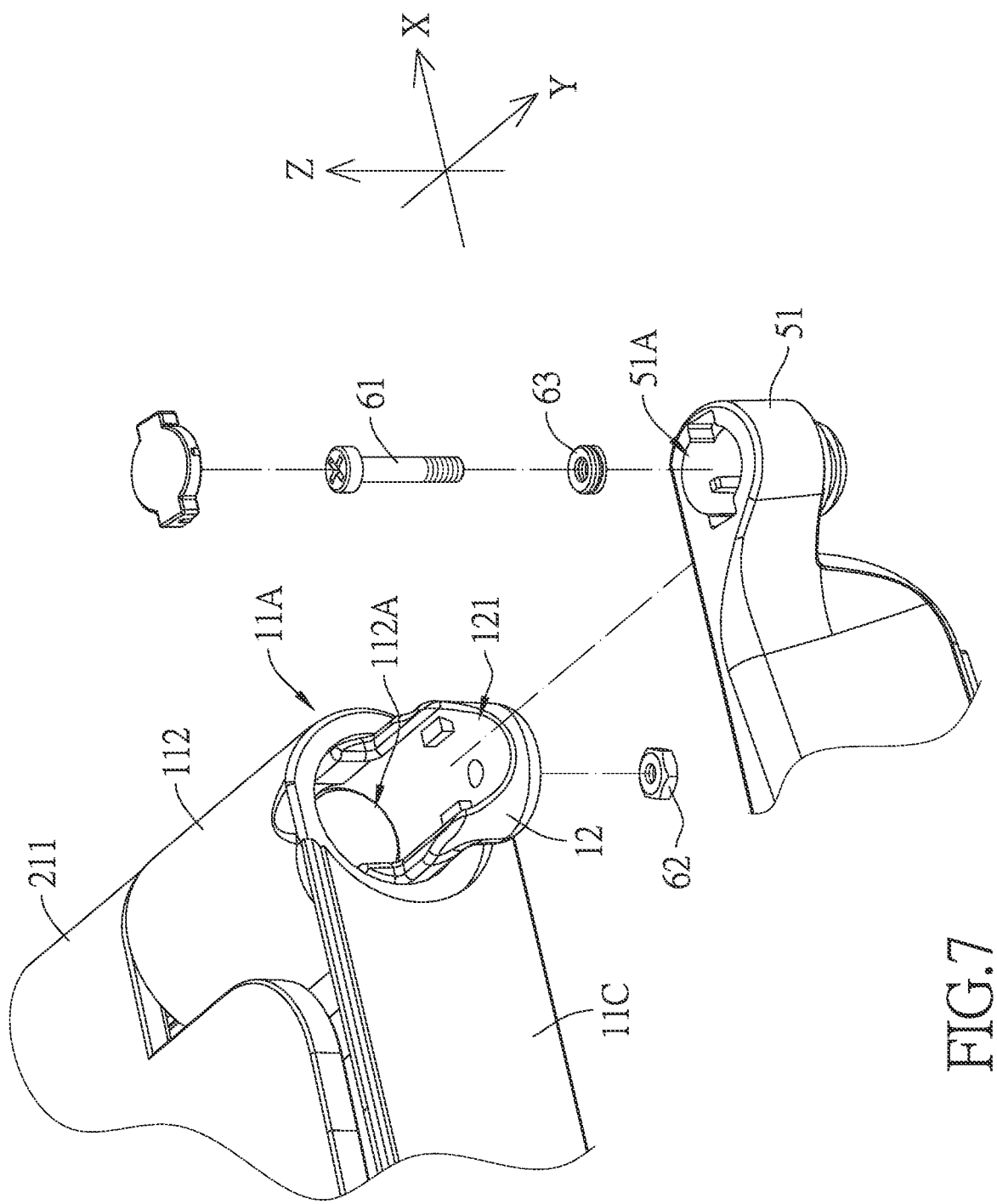
FIG. 7 is an exploded view of a part of the fixing device for a portable electronic device of the invention.
Figure 8:
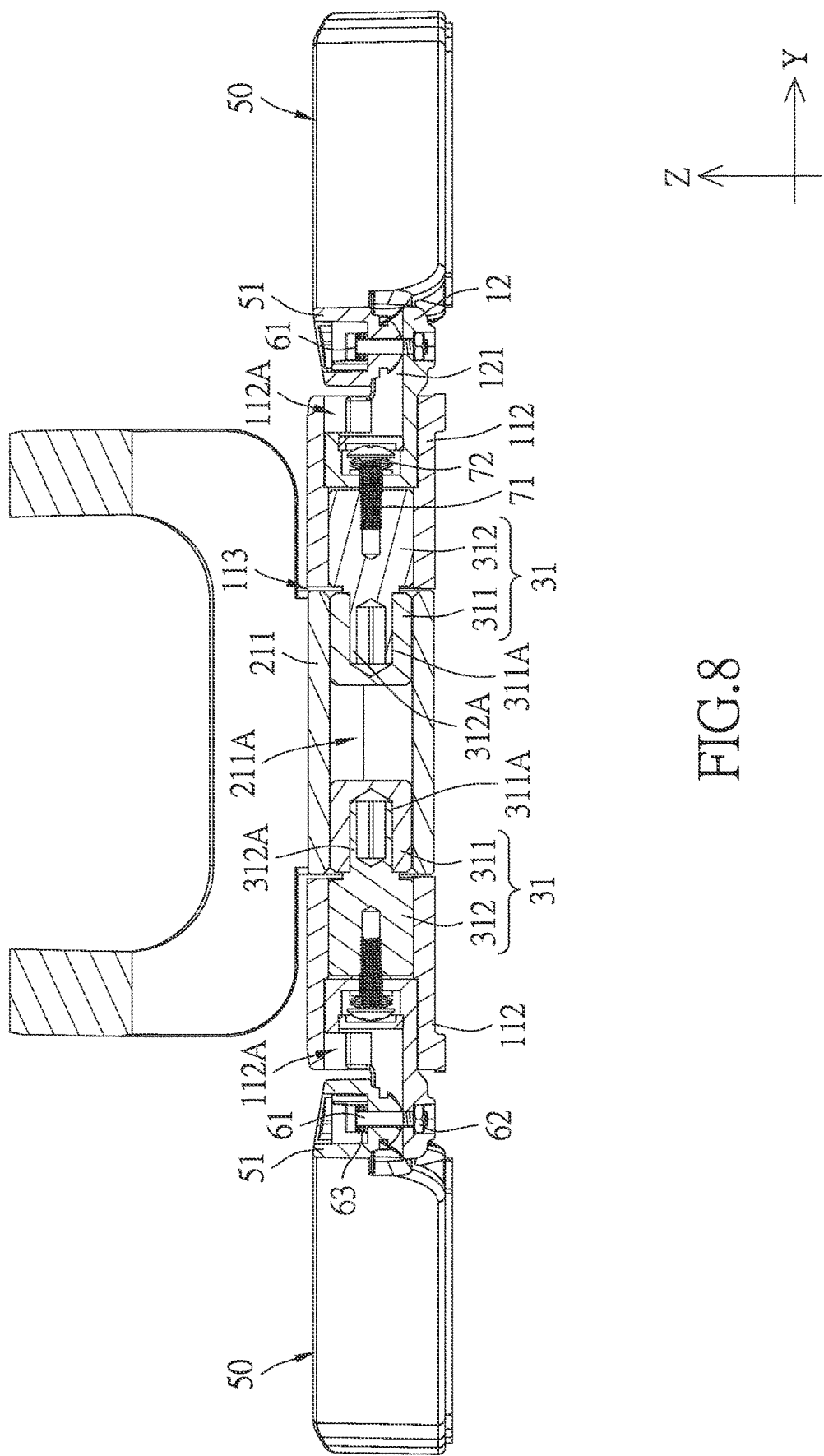
FIG. 8 is a cross-sectional view of the fixing device for a portable electronic device of the invention.
Figure 9:
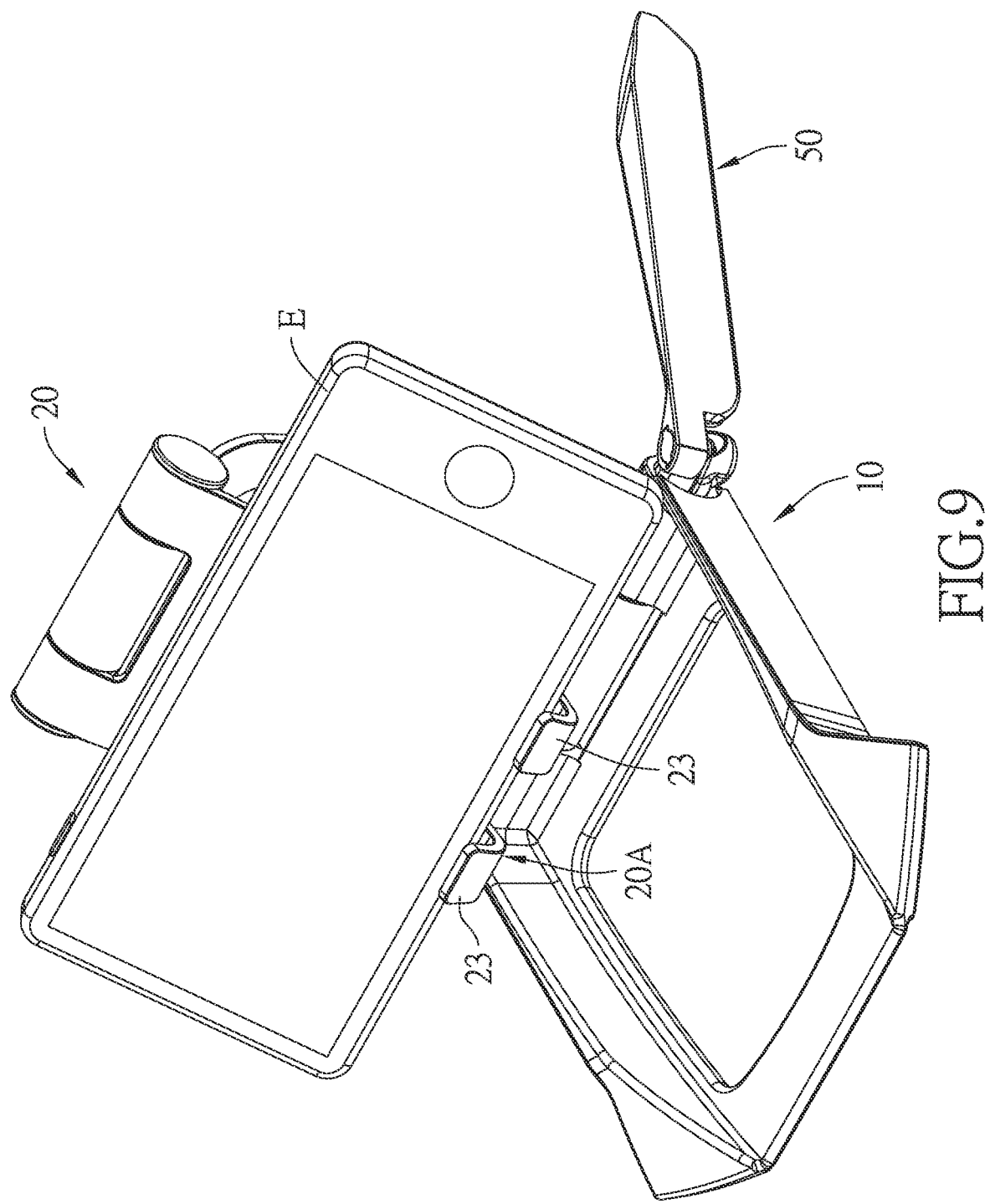
FIG. 9 is an illustrative view showing that the fixing device supporting the electronic device.

Preferably, please refer to FIGS. 7 and 8, each of the swivel members 50 includes an accommodating slot 51A at the pivoting end 51, and further includes a screw 61, a nut 62 and a elastic member 63. The elastic member 63 can be a plurality of conical springs, the screw 61 and the elastic member 63 are disposed in the accommodating groove 51A, the nut 62 is abutted against the base 10, the screw 61 penetrates the elastic member 63, the swivel member 50 and the base 10 along a vertical direction Z and is locked into the nut 62 to lock the swivel member 50 to the base 10. The vertical direction Z is perpendicular to the transverse direction Y and the longitudinal direction X, so that the swivel member 50 can pivot with the screw 61 as the pivoting center.

Figure 4:
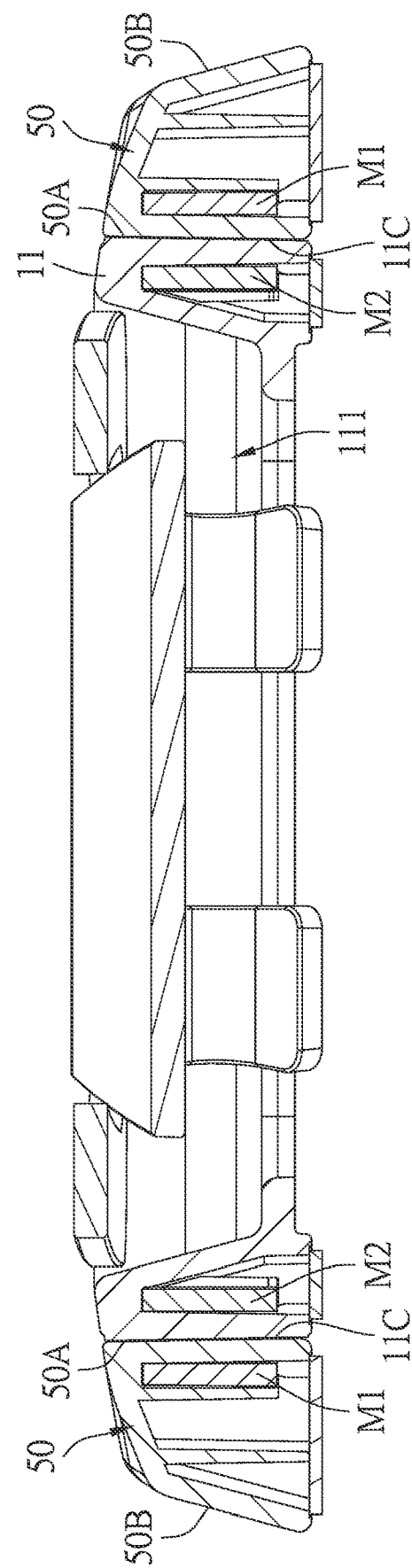
FIG. 4 is a cross-sectional view of the fixing device for a portable electronic device of the invention.
Figure 5:
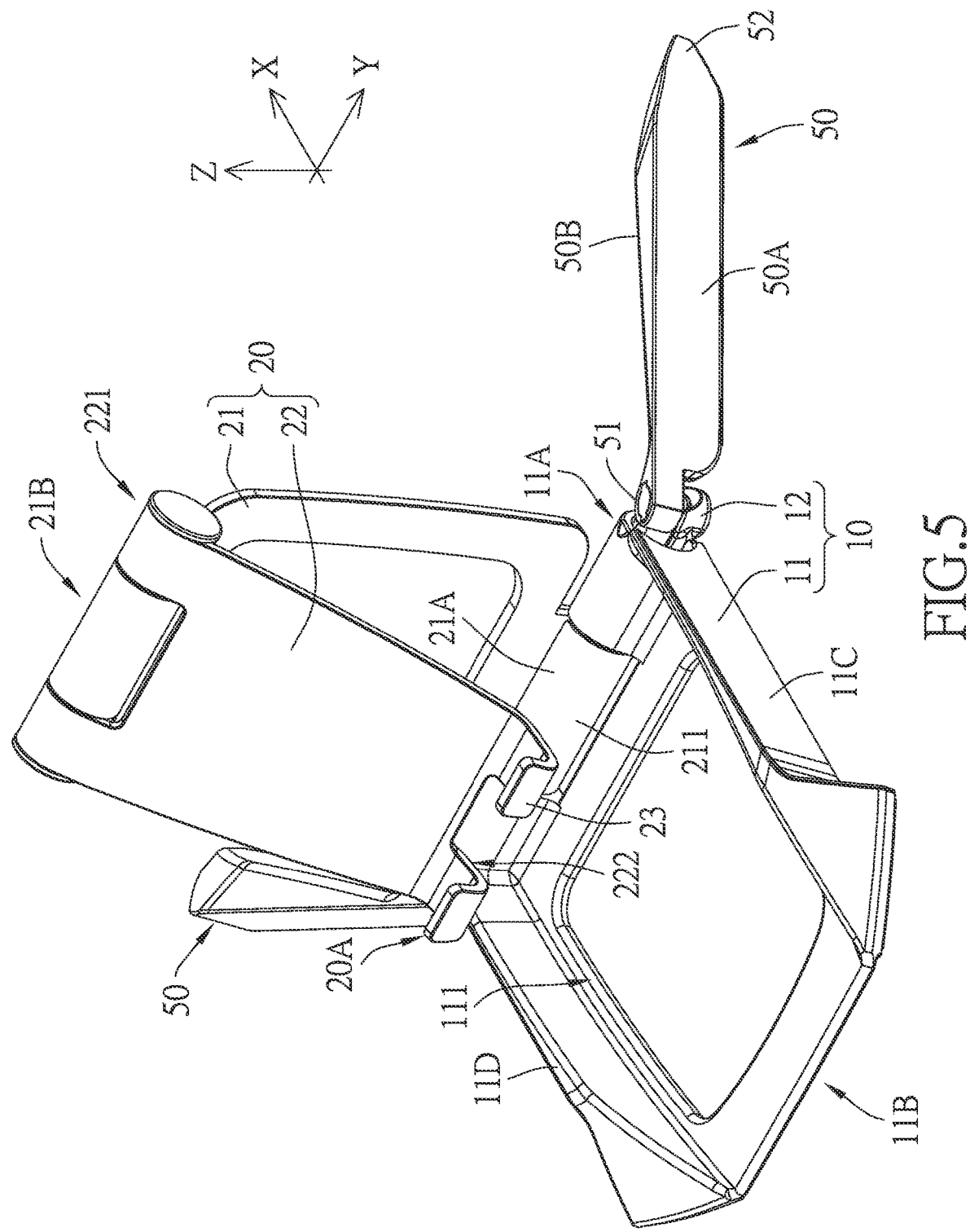
FIG. 5 is an illustrative view showing the fixing device for a portable electronic device of the invention in the unfolded state.

Preferably, please refer to FIGS. 1 and 4, each of the swivel members 50 includes an inner side 50A and an outer side 50B opposite to each other, the inner side 50A is closer to the main body 11 than the outer side 50B. The inner side 50A is provided with a first magnetic member M1, the main body 11 is provided with a second magnetic member M2 on the first side surface 11C and the second side surface 11D, respectively. When the swivel member 50 approaches the main body 11, the first magnetic member M1 and the second magnetic member M2 correspond to each other in positions and attract each other, so that the swivel member 50 can be fixed at a predetermined position.

Figure 6:
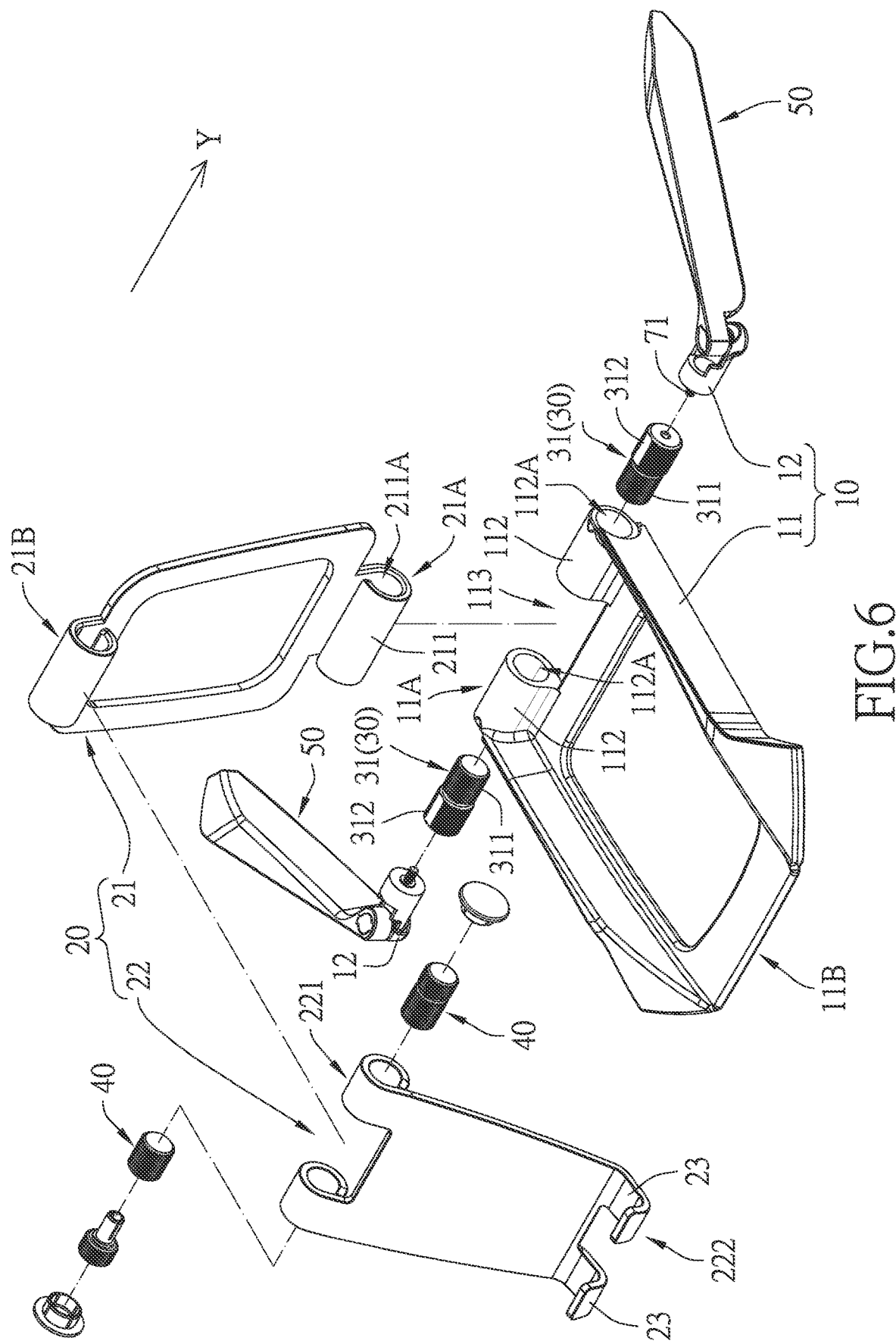
FIG. 6 is an exploded view of the fixing device for a portable electronic device of the invention.

In a preferred embodiment, please refer to FIGS. 6 and 8, the main body 11 includes two accommodating portions 112 at the first end 11A, and the two accommodating portions 112 are separated by a distance. A space 113 is formed between the accommodating portions 112, the two accommodating portions 112 are generally cylindrical, and the two accommodating portions 112 respectively includes a first through hole 112A penetrating along the transverse direction Y. The first bracket 21 includes a receiving portion 211 at the first pivoting end 21A. The receiving portion 211 is generally cylindrical. The receiving portion 211 is disposed in the space 113 and is adjacent to the two accommodating portions 112. The receiving portion 211 includes a second through hole 211A penetrating along the transverse direction Y, and the second through hole 211A is aligned with the first through holes 112A. The pivoting unit 30 includes two pivoting groups 31, the two pivoting groups 31 respectively include a pivoting member 311 and a corresponding member 312, the two pivoting members 311 are both disposed in the second through hole 211A, and the two corresponding members 312 are respectively disposed in the two first through holes 112A, so that the pivoting members 311 are able to pivot relative to the corresponding members 312. The pivoting members 311 each include a pivot hole 311A, and the corresponding members 312 each include a protruding post 312A extending from a side surface of the corresponding member 312 adjacent to a corresponding one of the pivoting members 311, and the protruding post 312A is inserted in the pivot hole 311A and can be rotated in the pivot hole 311A.

Preferably, please refer to FIGS. 6, 7 and 8, the base 10 further includes two rotating seats 12, and one end of each of the two rotating seats 12 is locked to a corresponding one of the corresponding members 312 and is located in a corresponding one of the accommodating portions 112, so that the two rotating seats 12 can rotate synchronously with the corresponding members 312, the other end of each of the two rotating seats 12 includes a groove 121 and is extend out of a corresponding one of the accommodating portions 112, and the pivoting end 51 of each of the swivel members 50 is disposed in a corresponding one of the grooves 121, and each of the nuts 62 is abutted against a side surface of a corresponding one the rotating seats 12 facing away from a corresponding one of the grooves 121.

Preferably, please refer to FIG. 8, the invention further includes an inserting member 71 and a spring 72, the inserting member 71 is inserted through the spring 72 and the rotating seats 12 along the transverse direction Y and is locked in the corresponding members 312 to lock the rotating seats 12 to the corresponding members 312, so that the rotating seats 12 can rotate synchronously with the corresponding members 312.

In summary, with the pivoting end 51 of each of the swivel members 50 pivotally connected to the side surface of the main body 11, the swivel member 50 can rotate relative to the main body 11 to approach or move away from the main body 11. Therefore, the swivel member 50 can provide a supporting force when in use, and the rotation angle of the swivel member 50 can be adjusted according to different situations, so as to erect the base 10 stably.

In addition to this, the swivel members 50 of the invention are also pivotally disposed to the rotating seats 12, and the rotating seats 12 are locked to the corresponding members 312, so the swivel members 50 can rotate synchronously with the rotating seats 12 and the corresponding members 312, so that the swivel member 50 can pivot along the rotation trajectory of the rotating seat 12 to increase the adjustable range of the swivel member 50 and improve the practicability of the swivel member 50, for example, to support the user's body.

Figure 10:
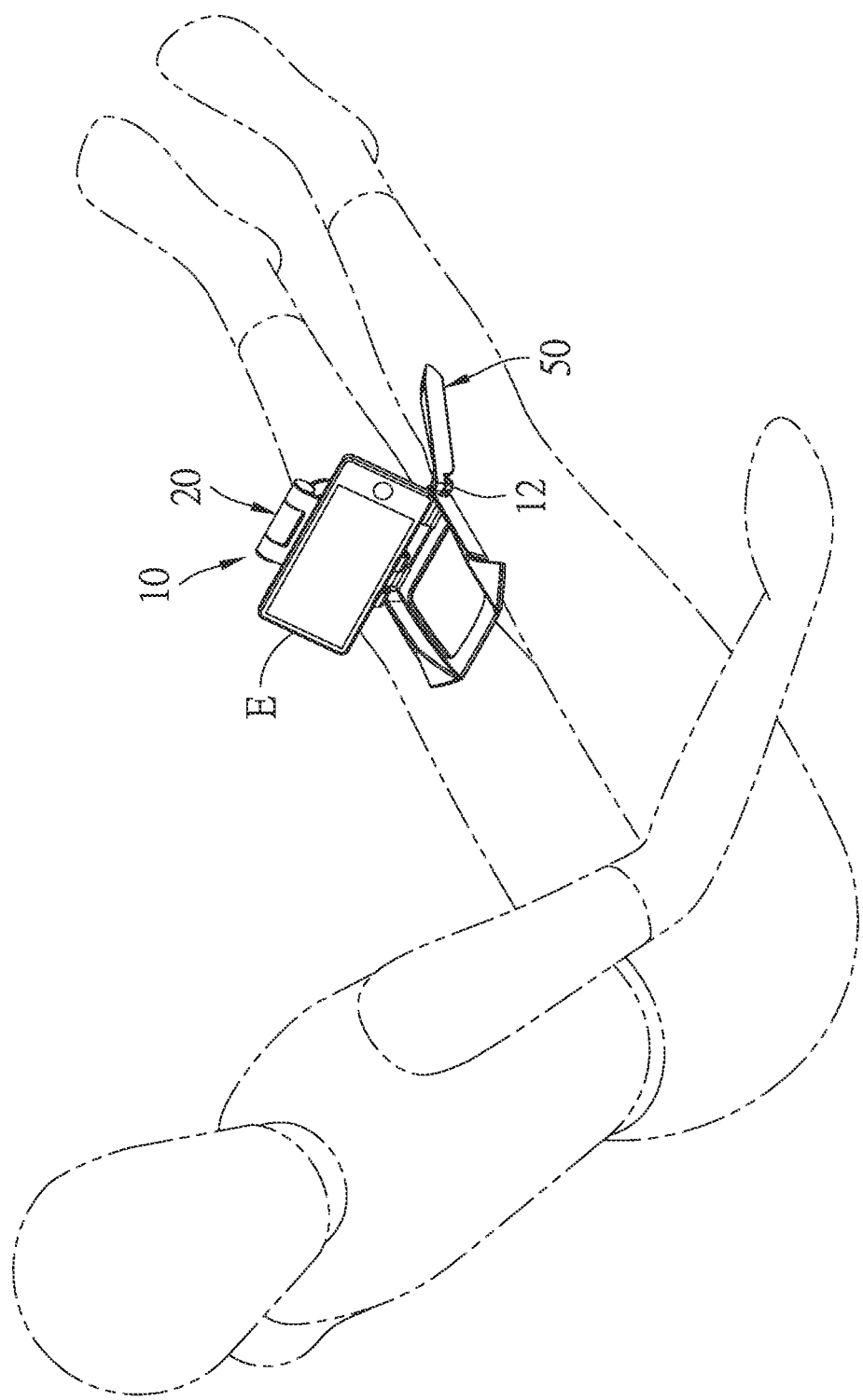
FIG. 10 is an illustrative view of the invention showing that a user is using the fixing device.

Please refer to FIG. 10, the user is in a reclined or lean-back position, the base 10 can be stably erected on the user through the swivel member 50, since the swivel members 50 can use the screws 61 as the pivot center to rotate relative to the main body 11 and can also rotate with the rotating seats 12, the swivel members 50 have two rotation directions, and the angles of the two swivel members 50 can be adjusted respectively, so it can provide at least three stable supporting points, according to different actions of the user, to effectively fix the electronic device E.

What is claimed is:

1. A fixing device for a portable electronic device, comprising:
  a base including a main body, the main body including a first end and a second end opposite to each other, the main body further including a first side surface and a second side surface opposite to each other;
  a flip frame having one end pivotally connected to the first end, and the flip frame further including a holding portion for holding an electronic device, the flip frame is pivoted to the main body through a pivoting unit;

two swivel members each including a pivoting end; and the base further including two rotating seats, and each of the two rotating seats being locked to the pivoting unit, and the pivoting ends of the two swivel members being pivotally disposed to the two rotating seats;

wherein the main body includes two accommodating portions at the first end, a space is formed between the accommodating portions, the two accommodating portions respectively includes a first through hole, the flip frame includes a receiving portion disposed in the space, the receiving portion includes a second through hole aligned with the first through holes, the pivoting unit includes two pivoting groups, the two pivoting groups respectively include a pivoting member and a corresponding member, the two pivoting members are both disposed in the second through hole, and the two corresponding members are respectively disposed in the two first through holes, so that the pivoting members are able to pivot relative to the corresponding members, and the rotating seats are locked to the corresponding members, respectively.

2. The fixing device for the portable electronic device as claimed in claim 1, wherein the flip frame includes a first bracket and a second bracket, the first bracket includes a first pivoting end and a second pivoting end opposite to each other, the receiving portion is located at the first pivoting end, the second bracket includes a joint end and a bearing end opposite to each other, the second pivoting end of the first bracket is pivotally connected to joint end of the second bracket through a rotating member, and the holding portion is located at the bearing end of the second bracket.

3. The fixing device for the portable electronic device as claimed in claim 1, wherein the pivoting members each include a pivot hole, the corresponding members each include a protruding post extending from a side surface of the corresponding member adjacent to a corresponding one of the pivoting members, and the protruding post is inserted in the pivot hole and is able to rotated in the pivot hole.

4. The fixing device for the portable electronic device as claimed in claim 1 further comprising an inserting member and a spring, the inserting member is inserted through the spring and the rotating seats and is locked in the corresponding members to lock the rotating seats to the corresponding members.

5. The fixing device for the portable electronic device as claimed in claim 1, wherein each of the swivel members includes an inner side and an outer side opposite to each other, the inner side is closer to the main body than the outer side, the inner side is provided with a first magnetic member, the main body is provided with a second magnetic member on the first side surface and the second side surface, respectively, and the first magnetic member and the second magnetic member correspond to each other in positions and attract each other.

6. The fixing device for the portable electronic device as claimed in claim 1, wherein the main body includes a groove portion for accommodating the flip frame.

7. The fixing device for the portable electronic device as claimed in claim 1, wherein the holding portion is two stop hooks located at the bearing end, and the two stop hooks are separated by a distance.

8. A fixing device for a portable electronic device, comprising:

a base including a main body, the main body including a first end and a second end opposite to each other, the main body further including a first side surface and a second side surface opposite to each other;

a flip frame having one end pivotally connected to the first end, and the flip frame further including a holding portion for holding an electronic device, the flip frame is pivoted to the main body through a pivoting unit;

two swivel members each including a pivoting end; and the base further including two rotating seats, and each of the two rotating seats being locked to the pivoting unit, and the pivoting ends of the two swivel members being pivotally disposed to the two rotating seats;

a screw, a nut and an elastic member, the nut is abutted against the rotating seats, the screw penetrates the elastic member, the swivel member and the rotating seats and is locked into the nut to lock the swivel member to the rotating seats.

9. The fixing device for the portable electronic device as claimed in claim 8, wherein the two swivel members each include a supporting end opposite to the pivoting end, one of the swivel members is pivoted to the first side surface, the other swivel member is pivoted to the second side surface, the two swivel members are pivoted to the first end, the supporting end is used for supporting the main body, each of the swivel members includes an accommodating slot at the pivoting end, and the screw and the elastic member are disposed in the accommodating groove.

10. The fixing device for the portable electronic device as claimed in claim 8, wherein the flip frame includes a first bracket and a second bracket, the first bracket includes a first pivoting end and a second pivoting end opposite to each other, the receiving portion is located at the first pivoting end, the second bracket includes a joint end and a bearing end opposite to each other, the second pivoting end of the first bracket is pivotally connected to joint end of the second bracket through a rotating member, and the holding portion is located at the bearing end of the second bracket.

11. The fixing device for the portable electronic device as claimed in claim 10, wherein the holding portion is two stop hooks located at the bearing end, and the two stop hooks are separated by a distance.

12. The fixing device for the portable electronic device as claimed in claim 8, wherein the pivoting unit includes two pivoting groups, the two pivoting groups respectively include a pivoting member and a corresponding member, the pivoting members each include a pivot hole, the corresponding members each include a protruding post extending from a side surface of the corresponding member adjacent to a corresponding one of the pivoting members, and the protruding post is inserted in the pivot hole and is able to rotated in the pivot hole.

13. The fixing device for the portable electronic device as claimed in claim 8 further comprising an inserting member and a spring, wherein the pivoting unit includes two pivoting groups, the two pivoting groups respectively include a pivoting member and a corresponding member, the inserting member is inserted through the spring and the rotating seats and is locked in the corresponding members to lock the rotating seats to the corresponding members.

14. The fixing device for the portable electronic device as claimed in claim 8, wherein each of the swivel members includes an inner side and an outer side opposite to each other, the inner side is closer to the main body than the outer side, the inner side is provided with a first magnetic member, the main body is provided with a second magnetic member on the first side surface and the second side surface, respectively, and the first magnetic member and the second magnetic member correspond to each other in positions and attract each other.

15. The fixing device for the portable electronic device as claimed in claim 8, wherein the main body includes a groove portion for accommodating the flip frame.

* * * * *